United States Patent Office 2,969,185
Patented Jan. 24, 1961

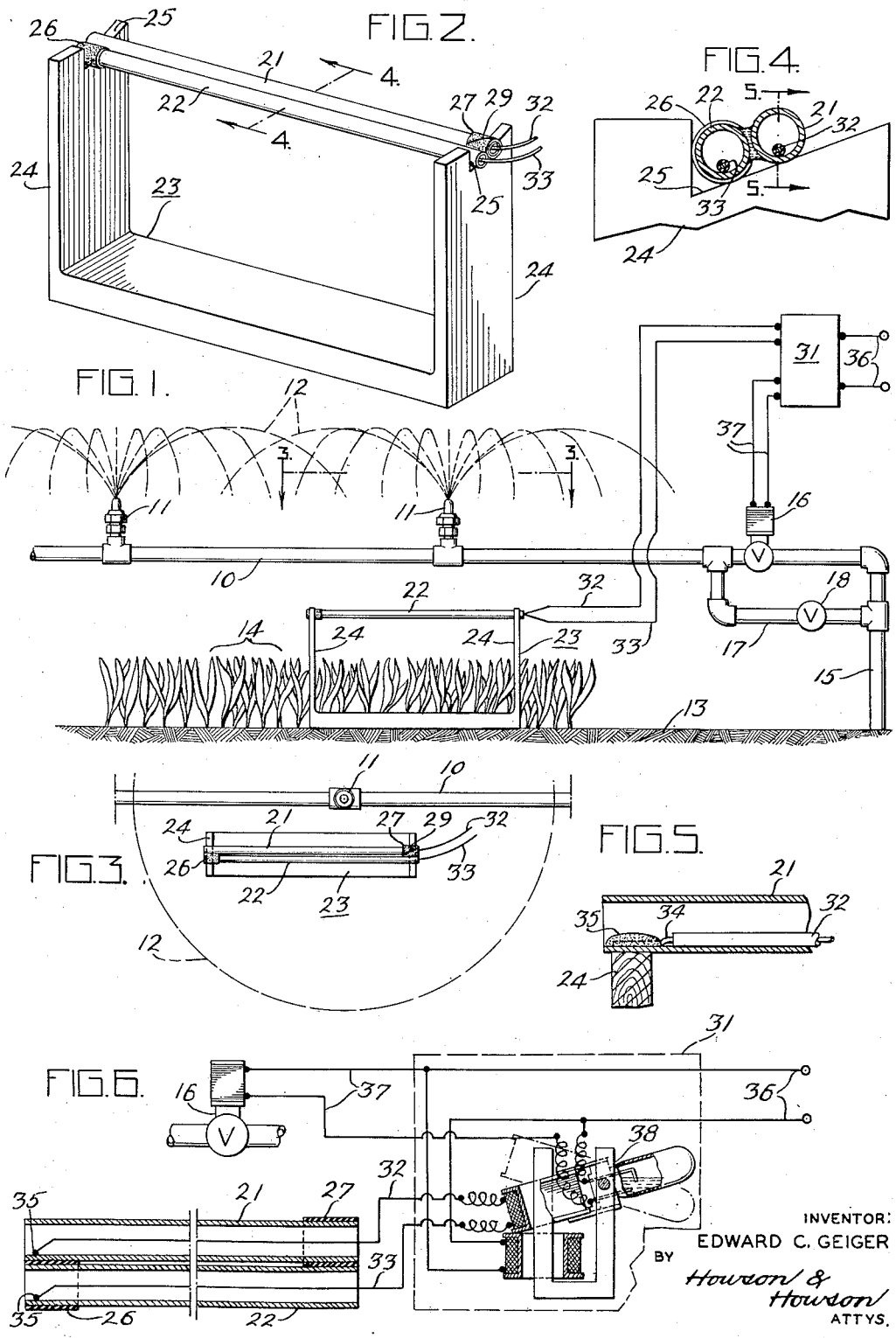

2,969,185

AUTOMATIC MISTING SYSTEM

Edward C. Geiger, North Wales, Pa.

Filed Sept. 8, 1958, Ser. No. 759,738

1 Claim. (Cl. 239—63)

The present invention relates to misting systems for cutting beds and the like and more particularly to automatic misting systems responsive to the atmospheric conditions surrounding the bed.

For efficient and effective plant growth, it is necessary to maintain the cutting bed moist, and prior to the present invention this has been accomplished by periodically spraying the bed with a fine mist. Automatic systems have been provided which provide a timer-controlled misting system, but none of the prior art systems is entirely satisfactory. For efficient and effective operation, it is necessary to properly control the cycle or timing interval of the misting operation. Too much water around the plants promotes disease and wastes water whereas too little water causes the leaves of the plant to wilt and retards rooting. The amount of water necessary is dependent not only on the amount of sunlight or length of day, but also on the humidity of the surrounding atmosphere. In timed misting systems, it is possible to compensate for changes in season and length of day, but it is difficult, if not impossible, to compensate for changes in the humidity of the surrounding atmosphere which may occur instantaneously.

With the foregoing in mind, the present invention provides a misting system which is responsive to the condition of the atmosphere surrounding the cutting bed so that a greater supply of mist is provided when the atmosphere is such as to cause rapid evaporation than when the atmosphere is such as to retard evaporation of moisture from the bed.

The present invention provides an automatically controlled misting system which is devoid of timers and other expensive control devices, but is fully effective in operation and use.

All of the objects of the present invention and the various features and details of the construction and operation of the system are more fully set forth hereinafter with reference to the accompanying drawings in which:

Fig. 1 is a view in side elevation of a misting system made in accordance with the present invention;

Fig. 2 is a perspective view of the moisture-sensing electrodes of the system;

Fig. 3 is a sectional view taken on the line 3—3 of Fig. 1 showing the mounting of the sensing electrodes;

Fig. 4 is a fragmentary sectional view taken on the line 4—4 of Fig. 2;

Fig. 5 is a fragmentary sectional view taken on the line 5—5 of Fig. 4; and

Fig. 6 is a schematic view showing the automatic controls of the invention.

Referring to the drawings, the misting system comprises a spray pipe 10 having a plurality of misting nozzles 11 connected thereto and operable to direct a mist as indicated at 12 over the cutting bed 13. The spray pipe 10 is mounted level at a sufficient distance above the foliage of the cuttings 14 to preclude interference of the pipe 10 with the cuttings. The spray pipe 10 is connected to a liquid supply pipe 15 by a solenoid valve 16 and a by-pass 17 having a manually controlled valve 18 therein. The valve 18 is normally closed and is opened only when it is desired to manually control the misting due to failure of the electric supply or for other purposes.

In accordance with the invention the operation of the solenoid valve 16 is controlled automatically in accordance with the requirements of the cutting bed, as determined by the prevailing atmospheric conditions. To this end a pair of electrodes is mounted in the path of the mist 12 supplied by one of the misting nozzles 11. In the present instance, the electrodes consists of tubes 21 and 22, preferably formed to Monel metal and mounted on an insulating stand 23. In the illustrated embodiment of the invention, the stand comprises a U-shaped frame having upstanding legs 24, 24 formed with notches or grooves 25, 25 in their upper edge.

The electrodes 21 and 22 rest in the grooves 25, 25 and are maintained in spaced relation at their ends by insulating elements 26 and 27 respectively. In the present instance the insulating elements 26 and 27 comprise strips of plastic insulating tape having a suitable adhesive for securing the tape to the electrodes. In the illustrated embodiment of the invention, the remote end of the electrode 22 is wrapped with the insulating tape 26 whereas the near end of the electrode 21 is wrapped with the insulating tape 27. The tape is wrapped with a single thickness at each end so as to insure uniform clearance between the electrodes along the entire length thereof. Preferably the tape is cut on a bias as indicated at 29 so that if the adjacent ends do not meet there is no possibility of the other electrode making contact with the wrapped electrode through the clearance between the ends of the tape. Of course, the same electrode may be wrapped at both ends with the insulating tape, in which case the other electrode need not be wrapped. If it is desired to have a greater clearance between the electrodes 21 and 22, additional thicknesses of tape may be applied, or tape having a greater thickness may be used. It has been found that "No. 33" plastic tape provides a satisfactory clearance between the electrodes when wrapped once about the electrodes.

It is noted that since the electrodes 21 and 22 are freely supported on the legs 24, 24 in the grooves 25, 25, they may be readily removed for cleaning of mineral deposits and the like which may accumulate thereon in normal usage. Likewise the free mounting of the electrodes permits them to be rotated on their axis to expose new surfaces and provide full use of the entire perimeter of the electrodes. By using stands having different length legs, it is possible to place the electrodes just above the top of the foliage of the plants in the bed and the electrodes may be shifted about in the bed, to provide the best results.

In the operation of the system, the insulating members 26 and 27 maintain the electrodes 21 and 22 spaced apart so as to electrically insulate the two electrodes. The liquid supply pipe 15 supplies liquid to the spray pipe 10 and the nozzles 11 to direct a mist over the cutting bed 13 and the cuttings 14. During the misting operation, a certain amount of moisture will collect on the electrodes 21 and 22, and when sufficient moisture has accumulated thereon to bridge the gap between the electrodes 21 and 22, electrical communication therebetween is established. Electrical communication between the electrodes 21 and 22, as more fully set forth below operates the solenoid valve 16 to shut off the supply of liquid from the spray pipe 10 and the nozzles 11, thereby interrupting the misting. The interruption continues until such time as the moisture accumulated on the electrodes 21 and 22 and bridging the gap therebetween evaporates, at which time the electrical connection is interrupted and the solenoid valve 16 is operated to initiate the misting operation again. It is apparent that the resumption of the misting operation will be delayed on humid days when evaporation is retarded and will be more rapid when the humidity is less and evaporation from the electrodes 21 and 22, and also from the cutting bed 13 and cuttings 14, is rapid. It is noted that the electrodes 21 and 22 are spaced sufficiently above the foliage of the cuttings 14 so that the foliage does not interfere with the operation of the electrodes.

The electrodes 21 and 22 are connected to a control relay box 31 which operates the solenoid valve 16. To this end, insulated wires 32 and 33 run from the control box into the tubular electrodes 21 and 22. The free ends of the wires are stripped as indicated at 34 in Fig. 5 and are soldered as indicated at 35 to the electrode. By reason of the wire passing entirely through the electrode before being soldered thereto at its opposite end, the possibility of inadvertant disconnection of the end 34 from the tube 21 is effectively prevented.

The lines 32 and 33 are connected to the low voltage control terminals of a mercury relay 38 which makes or breaks contact between the input terminals 36 and the lines 37 leading to the solenoid valve 16. In the present instance when electrical contact is established between the electrodes 21 and 22, the relay is shifted from its full-line position to the broken-line position shown in Fig. 6 to break communication from the line 36 to the solenoid valve 16, thereby closing the valve and shutting off the supply of liquid to the spray pipe 10. Interruption of the electrical connection between the electrodes 21 and 22, on the other hand, returns the relay 31 to the full line position illustrated in Fig. 6 to reestablish electrical connection between the solenoid 16 and the line 36 to thereby open the solenoid valve and resume misting operation.

While the present invention has been described in connection with control of a misting operation for cutting beds, it is apparent that the invention has utility beyond this specific use. While a particular embodiment of the present invention has been herein illustrated and described, it is not intended to limit the invention to such disclosure but changes and modifications may be made therein and thereto within the scope of the following claim.

I claim:

An automatic misting system for cutting beds and the like comprising a sprinkler pipe extending over said bed and having a plurality of misting nozzles operable upon supply of liquid to said pipe to direct a mist of spray liquid over said bed, a solenoid-operated valve to control the supply of spray liquid to said pipe, a manually-operated valve connected to bypass said solenoid-operated valve for a manual control of said supply, and automatic control means to operate said solenoid-operated valve comprising a pair of spaced-apart conductive bar electrodes, a stand supporting said electrodes at their ends in an elevated position in the atmosphere above the foliage of the plants in said bed and in the path of the mist from at least one of said spray nozzles, and consisting of a U-shaped member having notches in the upper ends of the legs thereof to receive the bars, said bars resting freely in said notches and being maintained in closely spaced relation at each end thereof by tape secured to at least one of the bars, the thickness of the tape at each end determining the clearance space between the electrodes, said electrodes being insulated from one another and operable to be electrically connected by moisture accumulated thereon during supply of spray liquid to said pipe and to be electrically disconnected upon evaporation of said accumulated moisture, said control means operable upon electrical connection of said electrodes to operate said solenoid valve to interrupt the supply of spray liquid to said pipe, and operable upon disconnection of said electrodes to operate said solenoid valve to supply spray liquid to said pipe whereby said misting nozzles operate automatically to maintain the bed moist in accordance with the atmospheric conditions surrounding said bed.

References Cited in the file of this patent

UNITED STATES PATENTS

| | | |
|---|---|---|
| 2,612,901 | Milano | Oct. 7, 1952 |
| 2,647,234 | Pear | July 28, 1953 |
| 2,812,976 | Hasenkamp | Nov. 12, 1957 |